United States Patent
Blackburn

[15] 3,678,761
[45] July 25, 1972

[54] METHOD AND APPARATUS FOR DETERMINING UNBALANCE

[72] Inventor: Bobby J. Blackburn, Columbus, Ohio
[73] Assignee: IRD Mechanalysis, Inc., Worthington, Ohio
[22] Filed: Jan. 12, 1970
[21] Appl. No.: 2,100

[52] U.S. Cl. ................................. 73/457, 73/464
[51] Int. Cl. ........................................... G01m 1/28
[58] Field of Search ......................... 73/457, 462–465, 73/466

[56] References Cited

UNITED STATES PATENTS

| | | | |
|---|---|---|---|
| 3,077,781 | 2/1963 | Silver | 73/465 |
| 2,451,863 | 10/1948 | Oakley | 73/457 |
| 2,983,148 | 5/1961 | White | 73/465 |
| 2,924,977 | 2/1960 | Kenyon et al. | 73/465 |
| 3,501,965 | 3/1970 | Morrow | 73/462 |
| 3,115,042 | 12/1963 | Thomas et al. | 73/466 |
| 3,211,008 | 10/1965 | Ongaro et al. | 73/462 |

*Primary Examiner*—James J. Gill
*Attorney*—Harry B. Keck and George E. Manias

[57] ABSTRACT

A method and apparatus for determining the amount and location of corrective weight required to compensate unbalance in a vehicle wheel and tire without removing the wheel and/or tire from the vehicle. The wheel and tire are maintained out of contact with the ground and are turned at conventional highway speeds. An index tape is applied to the tire rim. Two separate spinnings of the wheel are required: one with a known trial weight affixed to the wheel rim, and one with the wheel and tire in their normal condition. Two meters are provided which are calibrated to indicate the amount of unbalance compensating weight required at the wheel rim and the angular position of the compensating weight relative to the index tape. The method and apparatus are applicable to other rotatable bodies.

4 Claims, 14 Drawing Figures

Patented July 25, 1972

INVENTOR.
BOBBY J. BLACKBURN
By
Harry B. Keck
Attorney

INVENTOR.
BOBBY J. BLACKBURN
By
Attorney

INVENTOR.
BOBBY J. BLACKBURN
By Harry B Keck
Attorney

METHOD AND APPARATUS FOR DETERMINING UNBALANCE

BACKGROUND OF THE INVENTION

1. Field of the Invention

The invention relates to balancing of rotatable bodies and especially of wheels of vehicles without requiring removal of such wheels from the vehicle.

2. Description of the Prior Art

Unbalance in vehicle wheel and tire assemblies can result from a number of sources, for example, mass eccentricity of the tire; mass eccentricity of the wheel; axle misalignment; hub misalignment; mass eccentricity of the wheel cover; and the like. Wheel unbalance tends to cause vibrations which are objectionable to the vehicle occupants and which cause uneven and excessive wear of a vehicle and its tires. In general, the effects of wheel unbalance can be compensated by attaching a single weight to the wheel rim at a location which is diametrically opposed to the equivalent heavy spot of the wheel. There are some situations where compensating weights cannot correct the vehicle wheels, of course, e.g., a badly worn bearing or a loose bearing will create wheel unbalance which cannot be compensated by adding correction weights.

In the prior art there are two general types of methods and apparatus for determining vehicle wheel unbalance. These two types are the motionless type and the in-motion type. The prior art systems alternatively can be subdivided according to those which (a) require removal of the wheel from the vehicle for measurement in extrinsic equipment; and (b) those which accomplish the unbalance correction without removing the wheel from the vehicle.

Examples of the motionless on-the-car wheel unbalance correction are U.S. Pat. Nos. 3,139,757 and 3,280,637. In both of these systems, the wheel is allowed to settle freely until its heavy spot appears at the bottom due to gravitational forces. The method is not precise in establishing the amount of unbalance or in establishing the location of unbalance.

Examples of motionless balancing systems which require removal of the wheel and tire from the vehicle include U.S. Pat. Nos. 1,832,479; 1,842,818; 2,909,063; 2,979,958; 3,002,388; 3,036,468; 3,038,343; 3,055,221; 3,085,442; 3,122,021; 3,143,327; 3,148,456; 3,152,483; 3,152,484; 3,159,035; 3,161,063; 3,164,996; 3,165,932; 3,280,639; 3,335,611; 3,349,626; 3,357,258; 3,357,259; 3,365,954. Most of these systems depend upon visual inspection of a spirit level device for accomplishing the unbalance correction. The resulting unbalance correction is not precise in amount or location of the correction weights because of the relative insensitivity of spirit level devices. Moreover, these methods all require the additional step of removing the wheel and tire assembly from the vehicle and many of them require the absence of the wheel cover during the operation.

In-motion, off-the-car wheel balancing systems are shown in U.S. Pat. Nos. 2,316,524; 2,947,175; 3,036,467; 3,108,478; 3,130,587; 3,289,483. All of these systems require firstly, the removal of the wheel and tire from the motor vehicle and, secondly, special extrinsic apparatus on which the tire is to be remounted for unbalance measurements off the car. While these in-motion balancing systems are more precise than the motionless balancing systems, nevertheless, inherently they are objectionable because (a) they require the additional labor of removing the wheel and tire from the motor vehicle; and (b) they do not compensate for any hub or axle misalignment which may be causing an apparent unbalance when the theoretically balanced wheel and tire assembly is remounted on a misaligned axle or hub. Furthermore, most of these off-the-car, in-motion, balancing systems require absence of the wheel cover in order to achieve the unbalance measurement and correction.

The final class of unbalance correction devices are those employing in-motion balancing while the wheel and tire assembly remain on the motor vehicle. These processes and apparatus include U.S. Pat. Nos. 2,383,405; 2,662,396; 2,675,200; 2,680,974; 2,722,829; 2,723,555; 2,731,833; 2,954,699; 2,972,256; 3,016,751; 3,017,154; 3,058,712; 3,238,785; and Canada Pat. No. 741,078. Most of these systems employ a device which is secured to the vehicle wheel and which provides radially adjustable counterweights to offset the apparent unbalance of the wheel assembly. The operator of these systems manually adjusts the eccentric compensating weights and distributes compensating fluid in a fluid ring. The operator subjectively senses a condition of minimum unbalance, usually by placing a hand on the frame or bumper of the vehicle while the wheel is turning with the tentative compensating counter-weights in place. The system then is dismantled and corresponding permanent counterweights are affixed to the wheel rim. Most of these systems also require the removal of the wheel cover in order to accomplish the unbalance correction.

U.S. Pat. No. 2,383,405 provides a stroboscopic device for locating the angular position of wheel unbalance and employs a voltmeter which provides a "rough indication" of the amount of unbalance.

U.S. Pat. No. 3,238,786 provides an on-the-car system for in-motion determination of unbalance as a diagnostic principle — that is, to determine if unbalance exists. The system described in U.S. Pat. No. 3,238,786 is not adapted to correct any unbalance in the wheel and tire assembly. After using the system of U.S. Pat. No. 3,238,786 to learn that unbalance indeed is present, it will be necessary for the vehicle owner to resort to one of the other systems already described in order to attempt to correct the wheel unbalance.

SUMMARY OF THE INVENTION

According to the present invention, a system is provided which permits in-motion unbalance measurement and correction for an automobile wheel while the assembly is maintained on the vehicle in its normal presentation, i.e., it is not necessary to remove the wheel cover. It should be emphasized that some of the wheel covers which are provided in modern automobiles weigh as much as five pounds each. Any eccentric mass distribution within the wheel cover or any eccentric mounting of the wheel cover will introduce significant unbalance to the wheel assembly unless the wheel cover is considered as a component of the rotating system.

Specifically, according to the present invention, the automobile wheel under inspection is elevated above the ground. An indicator (e.g., metallic adhesive tape) is applied to the tire to establish a reference radius of the wheel. A known test weight (e.g., a 1-ounce weight) is firmly affixed temporarily to the wheel rim along the reference radius. A seismic, velocity-type vibration transducer is secured to the automobile frame; a proximity detector is placed on the ground adjacent to the vehicle tire. The proximity pickup and the seismic pickup are connected to electronic circuitry which will be hereinafter described. The wheel is turned at a rotational speed such that the unbalance will generate cyclic vibrations which can be translated to a cyclic electrical signal. The rotational speed preferably simulates the speeds of rotation of the wheel at normal highway speeds, e.g. 35 to 70 miles per hour. A range of from about 4 to 40 cycles per second will duplicate the normal wheel speeds. The selected speeds should accommodate the frequency ranges of the filters hereinafter described.

The electronic circuitry is adapted to generate a sinusoidal electrical signal which crosses zero voltage every time the indicator (e.g., metallic adhesive tape) on the wheel passes the proximity pickup. The mechanical vibrations generated by the unbalance of the vehicle wheel are measured by the seismic transducer and are converted into a sinusoidal electrical signal. The automobile wheel can be driven by the automobile engine itself if the wheel under inspection is a driven wheel. Alternatively, a perimeter driving device may be provided, for example, the type shown in U.S. Pat. No. 3,238,786 or U.S. Pat. No. 3,238,785.

The electronic circuitry is adjusted in a manner hereinafter to be described and the wheel is then stopped; the known test weight is removed from the tire; the wheel is brought up to a normal highway speed once more and the electronic circuitry is adjusted in a manner to be hereinafter described. These two adjustment operations establish inherent properties of the wheel and tire assembly so that the required compensating balance weight for the wheel and tire assembly can be indicated directly in amount (weight) and location (with respect to the reference radius on the wheel). Two meters are included in the electronic circuitry, one for directly indicating amount (weight) of unbalance compensating weight and the other for directly indicating the angular displacement of the compensating weight with respect to the reference radius.

By using the present system and method, an automobile wheel and tire assembly can be balanced precisely without removing the structure from the vehicle. The present system is precise and reproducible and provides the operator with exact information concerning the weight of unbalance correction which is required and the location on the wheel rim where such compensating weight should be placed in order to accomplish the desired unbalance correction.

A further feature of the present invention is that the operator can check the residual unbalance in the wheel assembly after the unbalance correction has been made, and can thereby verify with precision that the initial unbalance has been compensated.

DESCRIPTION OF THE PREFERRED EMBODIMENT(S)

Figure 1:
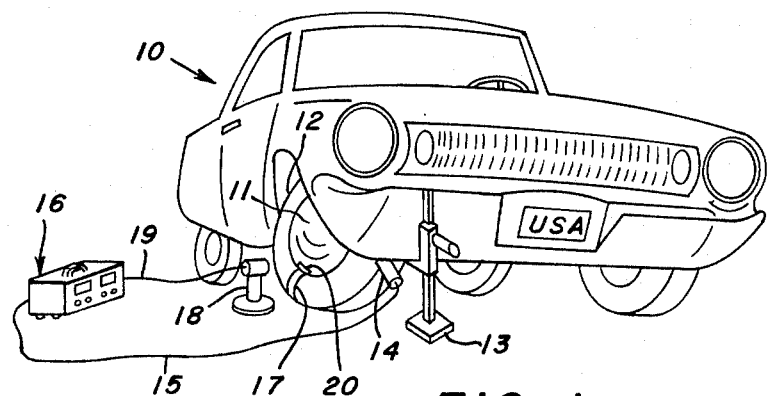
FIG. 1 is a perspective illustration of an automobile having right front wheel elevated away from contact with the ground and further having the apparatus of this invention assembled in operative relationship to the right front wheel and tire assembly.

Referring to FIG. 1, there is illustrated a typical automobile 10 having a right front wheel 11 and right front tire 12. The right front tire 12 is raised above the floor by means of a jack 13. A seismic vibratory electro-mechanical transducer 14 (also called a seismic pickup) is clamped securely to the frame of the automobile in any suitable manner, but preferably by means of a quick-release clamping device (not shown). The seismic pickup 14 may be clamped, for example, to the lower control arm of the vehicle suspension assembly in the manner described in U.S. Pat. No. 3,238,786. The seismic pickup 14 preferably is the type which generates a sinusoidal electrical signal corresponding to the harmonic mechanical vibrations to which it is subjected. Such seismic pickups are described, for example, in U.S. Pat. Nos. 3,344,397; 3,157,852; 2,754,435. A cable 15 connects the seismic pickup 14 to a casing 16 containing the electronic circuitry of the present apparatus.

An indicator 17 is provided on the wheel 11 between its periphery and its rotational axis, in the form of a strip of metallic tape which can be self-adhered to the tire 12 to identify a reference radius of the wheel. A proximity pickup 18 is placed on the floor adjacent to the tire 12 and is connected by a cable 19 to the casing 16. The proximity pickup 18 consists of a coil of wire which acts as a pulse generator. As the indicator (e.g., metallic ferrous tape) 17 passes the coil, a positive pulse is generated within the coil. Other alternative pulse generating apparatus may be employed, for example, the indicator 17 may be a light (or dark) visible index which activates with each rotation of the wheel, a photo-sensitive element, i.e., a photo-sensitive electronic valve such as a photocell or a semi-conductor in place of the proximity pickup 18.

A known test weight 20 is attached to the rim of the wheel 11, preferably along the reference radius established by the indicator 17. Conveniently, the test weight 20 is about 1 ounce to simplify instrument calibration at unity.

A drive means (not shown) is provided to turn the wheel 11 and tire 12 at a speed which corresponds to a normal highway speed of about 35 to 70 miles per hour. The drive mechanism shown in U.S. Pat. No. 3,238,786 may be used. Alternatively, a portable drive unit having peripheral engagement with the tire 12 may may be adopted.

ELECTRONIC CIRCUITRY

Figure 2:
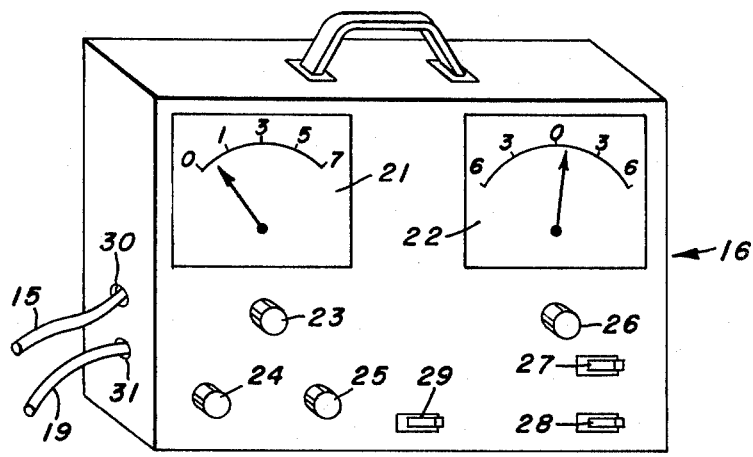
FIG. 2 is a perspective illustration of a portable case containing the electronic circuitry of the present apparatus.

Referring now to FIG. 2, the electronic circuitry of the casing 16 will be described. The face of the casing 16 includes a direct current voltmeter 21 and a microammeter 22. It will be observed that the voltmeter 21 is calibrated in weight units from zero to about 7 ounces. It will further be observed that the scale of the voltmeter 21 is non-linear, i.e., it is a compressed scale similar to a logarithmic scale. The microammeter 22 has a scale with a center point corresponding to "12 o'clock" (high noon) position; the scale moves in each direction from the center to indicate clock hour deviations from "12 o'clock" (high noon) position. The casing 16 has:

a first adjustment knob 23;
a second adjustment knob 24;
a third adjustment knob 25;
a fourth adjustment knob 26;
an on-off switch 27;
a stage selection knob 28 having two positions; and
a phase meter selection knob 29.

The two cables 15, 19 are connected to suitable jacks 30, 31 in the casing 16.

PRINCIPLES OF OPERATION

Referring to FIGS. 3–7, the principles of the present wheel unbalance determination apparatus method will be explained. The unbalance determination is carried out in two different stages which will now be described.

Figure 3:
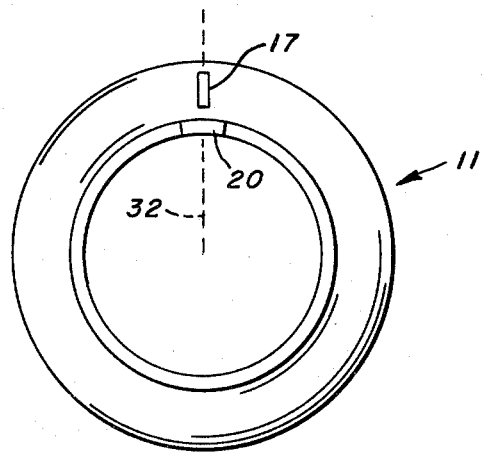
FIG. 3 is a view of a typical wheel and tire assembly illustrating the condition of the wheel and tire assembly during the unbalance measurement of this invention.
Figures 4, 5, 6, 7, 8:
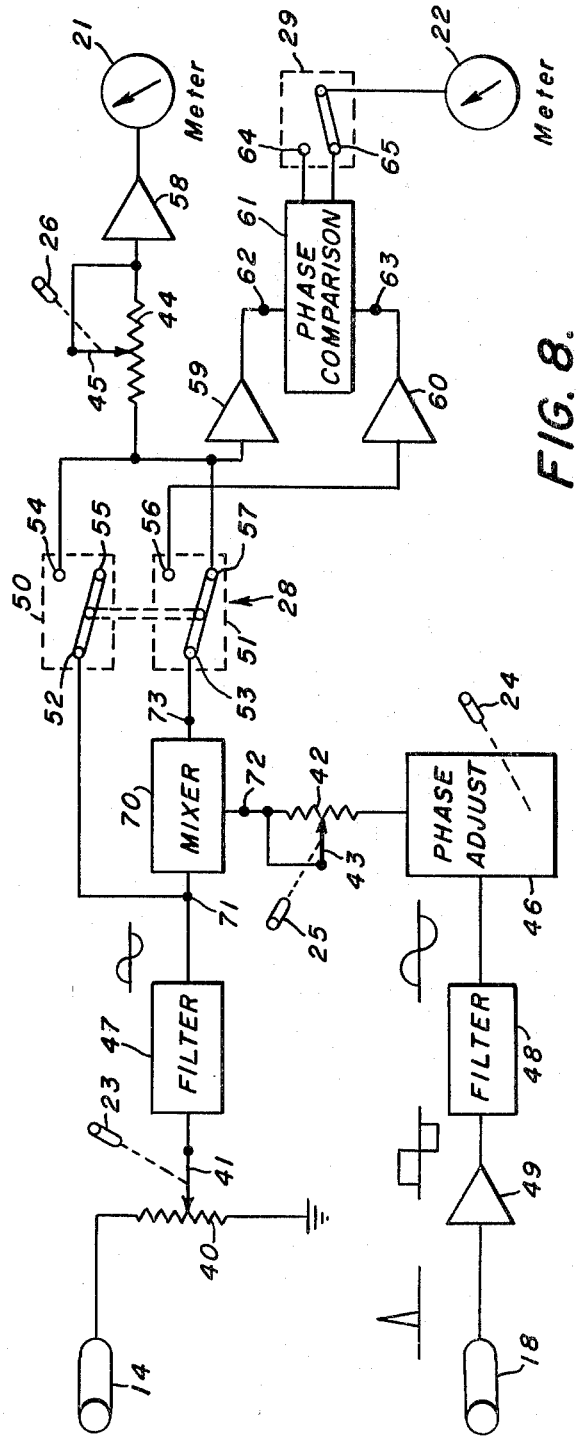
FIGS. 4, 5, 6 and 7 are vectorial representations of unbalance forces and of related electrical signals which illustrate principles of the present invention.
FIG. 8 is a schematic illustration of typical electronic circuitry of this invention.

In the first stage, FIG. 3, the rotating body, for example, an automobile wheel assembly 11, is equipped with the indicator 17 and the test weight 20 which are installed on a common reference radius 32. As the wheel 11 is rotated at a normal highway speed, the forces of the wheel can be represented vectorially as shown in FIG. 4 wherein the vector U represents the inherent unbalance existing within the wheel and the vector W corresponds to the unbalance resulting from the applied known unbalance test weight 20. The amount of the test weight 20 is known (e.g., it is 1 ounce) but the length of the vector W is unknown. Since the test weight 20 is mounted along the radius 32 determined by the indicator 17, the vector W is presented along that radius 32. The specific angular relationship θ between the vector U and the vector W is unknown. When the wheel of FIG. 3 is rotated at its normal highway speed, the actual unbalance U creates an effective unbalance vibration and similarly the known unbalance test weight 20 creates an unbalance manifestation W. The resultant of the two unbalance manifestations can be represented by a resultant vector R which is the vectorial sum of the vectors U and W. Therefore, while the wheel 11 is rotating as shown in FIG. 3 during Stage One, the seismic pickup 14 observes a mechanical vibration corresponding to the vector R. This vibration is converted through the seismic pickup 14 to a sinusoidal electrical signal, called herein a vibratory signal.

The electronic circuitry filters the vibratory signal from the seismic pickup 14 and produces a signal R which is an essentially clean sine wave having a fundamental frequency corresponding to the rotation speed of the wheel 11 and having an amplitude corresponding to the vector R, i.e., the resultant of U + W. The signal R also is out of phase from the vector W by the angle $\alpha$ which is unknown.

The electrical signal R has a fixed phase relation to the vector R which is dependent upon the electro-mechanical characteristics of the individual system. There is normally a mechanical lag and an electrical lag whereby the instantaneous peak of the electrical signal R differs in time from the instantaneous maximum vibration manifestation of the vector R. The electrical lag is an inherent function of the electrical components of the system. The mechanical lag is a function of the mass suspension properties of the individual motor vehicle wheel under consideration. While these mass suspension properties will differ from one vehicle to another, and will differ from one wheel to another within the same vehicle, nevertheless, so long as a single wheel is under consideration for unbalance determination, the mass suspension properties are fixed and the phase lag is self-cancelling for all of the measurements of that wheel. For these reasons, the phase lag angle will not be considered in the following discussion in order to avoid undue complication of the principles of operation. Accordingly it will be considered that the electrical signal R is the electrical analog of the vibration manifestation represented by the vector R and that the instantaneous voltage of the electrical signal R corresponds to the instantaneous amplitude of the mechanical vibration resulting from the vector R. The phase lag angle will be disregarded.

In order to establish a preliminary calibration of the circuitry, the operator a. sets the adjustment knob 25 to zero;
b. turns the adjustment knob 26 to about mid-scale; and
c. turns the adjustment knob 23 until the voltmeter 21 indicates the value of the test weight $W$, which is preferably 1.0 ounce.

The signal which is thus indicated at the voltmeter 21 is $K_1 R = W$ wherein $K_1$ is a calibration factor.

Referring to FIG. 5, the signal $K_1 R$ is illustrated as being in phase with the signal R and having the same length as the vector W of FIG. 4.

Using the proximity pickup 18 as a source of a pulse for each revolution of the wheel 11, the operator can generate synthetic sinusoidal reference signal S, FIG. 4, having a frequency identical with the rotational speed of the wheel 11. Since the signal S is generated from the proximity of the indicator strip 17 to the pickup 18, the signal S will be essentially in phase with the vector W which is aligned with the indicator strip 17. Hence, without adjustment, the signal S will be out of phase from the signal R by the angle $\alpha$. By adjusting the phase and amplitude of the synthetic reference signal S, the operator can produce a reference signal which is equal in amplitude and opposite in phase to the signal $K_1 R$. This is accomplished by turning the adjustment knob 24 to adjust the phase of the signal S by the angle $\phi$ and by turning the adjustment knob 25 to the amplitude of the signal S by the factor $K_2$. Thus the signal $K_2 S /\phi$ equals minus $K_1 R$. The proper adjustments of knobs 24, 25 is determined when the voltmeter 21 indicates zero. Note that the angles $\alpha$ and $\phi$ are supplementary.

Now the wheel is stopped and the trial weight 20 is removed to terminate Stage One of the unbalance determination.

In Stage Two the wheel is rotated again at a normal highway speed. Since the trial weight 20 has been removed, the unbalance manifestation W resulting from the trail weight is eliminated. Accordingly the vibratory signal which is delivered from the vibration transducer 14 corresponds to the actual unbalance appearing in the wheel 11, that is, U. This signal is acted upon by the same amplitude adjustment means to produce an output signal having an amplitude $K_1 U$, FIG. 6. This output signal $K_1 U$ is vectorially added to the previously derived signal $K_2 S /\phi$ and the resultant signal will be 180° out of phase from the signal originally corresponding to the vector W. See FIGS. 4 and 6. The amplitude of the resultant vector signal $[K_2 S /\phi + K_1 U]$ is adjusted by turning adjustment knob 26 until voltmeter 21 again indicates the value of the test weight W. The adjustment knob 26 applies an amplitude change of the factor $K_3$. Thus the signal $K_3 [K_2 S /\phi + K_1 U]$ equals minus W. The product of the factors $K_1$ and $K_3 = 1.0$. Accordingly when the signal $K_3 K_1 U$ (FIG. 7) is applied to the voltmeter 21, the reading is a direct indication of the amplitude of inherent unbalance of the wheel 11, i.e., the meter 21 indicates the value of U.

Figure 14:
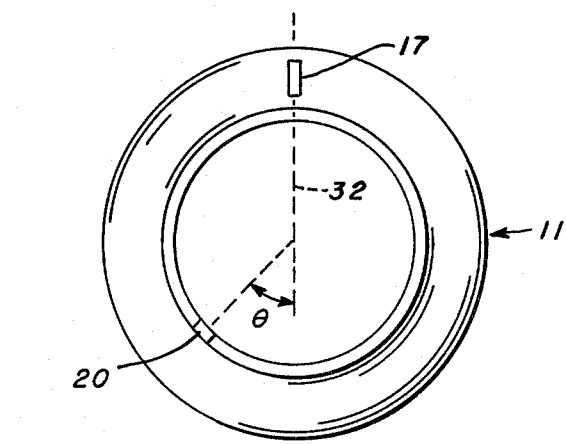
FIG. 14 is a view of a vehicle wheel with a correction weight applied to its rim.

By comparing the phase of the vectors $K_1 U$ and $[K_2 S /\phi + K_1 U]$ see FIG. 6, the angle $\theta$ can be directly determined. The angle $\theta$, see FIG. 14, is the displacement from the reference radius 32 where the correction weight must be applied in order to offset the inherent unbalance in the wheel 11.

CIRCUITRY

Referring to FIG. 8, a suitable circuitry for the present invention will be described. Corresponding numerals in FIG. 8 refer to items already discussed. The circuit generally includes:

a potentiometer 40 having a variable tap 41 which can be adjusted by the knob 23;

a rheostat 42 having a variable tap 43 which can be adjusted by the knob 25;

a rheostat 44 having a variable tap 45 which can be adjusted by the knob 26;

a phase adjustment circuit 46 adapted to alter the phase of an incoming signal according to the setting of an adjustment knob 24;

a pair of identical band pass filters 47, 48;

an integrated circuit 49 serving as an amplifier and a one-shot multivibrator;

a pair of mechanically ganged two position switches 50, 51 having input contacts 52, 53 respectively and output contacts 54, 55 and 56, 57 respectively;

a meter amplifier 58;

a pair of integrated circuits operating as limiter amplifiers 59, 60;

a phase comparison circuit 61 having two input terminals 62, 63 and two output terminals 64, 65.

THE REFERENCE SIGNAL CHANNEL

Figure 9:
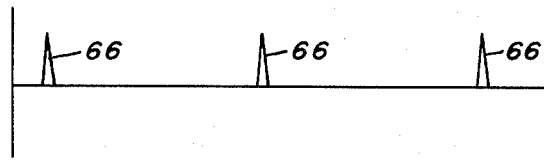
FIGS. 9, 10, 11, 12 and 13 are representations of electrical signals manifested within the present apparatus.
Figure 10:
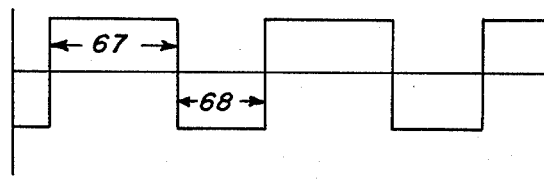
Figure 11:
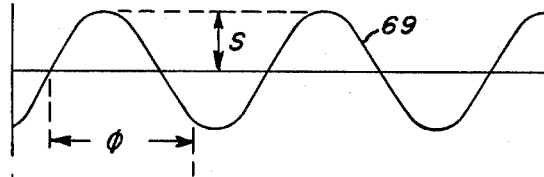
Figure 12:
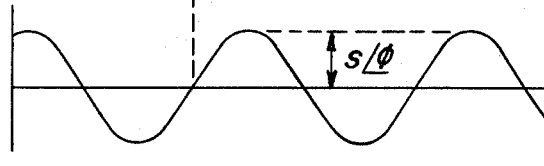
Figure 13:
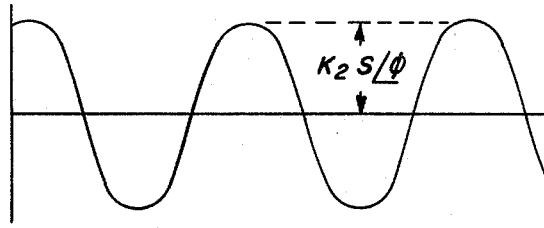

The synthetic reference signal S is developed in the circuitry in the manner shown in FIGS. 9-11. The transducer 18 produces a single pulse 66 at the same point of each rotation of the wheel 11 as shown in FIG. 9. The pulse signal of FIG. 9 is applied to the amplifier and one-shot-multi-vibrator 49. Each pulse 66 causes the multi-vibrator to conduct for a predetermined time (FIG. 10) indicated by the numeral 67 and to be negatively conducting for a period 68 thereafter until activated again by a further pulse from the transducer 18. The resulting electrical signal in FIG. 10 approximates a square wave when the conducting time 67 is approximately equal to the non-conducting time 68. The approximately square wave of FIG. 10 is delivered through the filter 48 and an essentially clean sine wave 69 results. The sine wave from the filter 48 is delivered through a phase adjustment means 46 whereby the operator can alter the phase as required. The phase adjusted signal S is delivered through a rheostat 42. The operator can adjust the knob 25 to alter the amplitude of the signal as required. Referring to FIGS. 12 and 13, the phase of the signal S (FIG. 11) is advanced by the angle $\phi$ to produce a signal in FIG. 12 of $S /\phi$. The amplitude of the signal in FIG. 12 can be adjusted by the factor $K_2$ to produce, as shown in FIG. 13, a synthetic sinusoidal reference signal $K_2 S /\phi$.

STAGE ONE

During Stage One the vibratory signal from the transducer 14 is delivered through the potentiometer 40, filter 47, mixer 70, switch 5 (output terminal 57), rheostat 44, meter amplifier 58, to the meter 21. The amplitude of the vibratory signal R is adjusted by turning the knob 23 until the meter 21 indicates the value of the test weight. Customarily the test weight is 1 ounce and the meter 21 indicates 1 ounce when the knob 23 has been properly adjusted. During this adjustment, the rheostat 42 is set to zero to isolate the mixer terminal 70. It is also preferable that the rheostat 44 will have its movable tap 45 approximately centered by appropriate midrange position of the knob 26. By maintaining the movable tap 45 near the center of the rheostat 44, it is possible for the operator to achieve an increase or decrease in the setting of the rheostat 45 as may be required in later manipulations.

While the wheel 11 continues rotating with the test weight 20 applied, the operator adjusts the knobs 24, 25 to deliver a phase-adjusted and amplitude-adjusted signal to the mixer 70 at the terminal 72. The signals from terminals 71, 72 are mixed in the mixer 70 and their summation is delivered through output terminal 73, switch 51, terminal 57, rheostat 44, amplifier 58 to the meter 21. The output of the mixer 70 consists of the vector sum of the two signals applied to terminals 71, 72, namely (at 71) the vibratory signal R as modified ($K_1$) in the potentiometer 40 and (at 72) amplitude-adjusted and phase-adjusted signals delivered from the rheostat 42.

When the signal at a terminal 72 is equal and opposite from the signal $K_1R$, at terminal 71, the output at terminal 73 will be zero and the voltmeter 21 will indicate zero. Thus by adjusting the knobs 24, 25 until the voltmeter 21 indicates zero, the operator thereby establishes the angle $\phi$ for the phase adjustment means 46 and establishes the constant amplitude correction $K_2$ for the rheostat 42. Thus the signal appearing at the input terminal 72 of the mixer 70 is $K_2S\,/\phi$ when the calibration is completed.

STAGE TWO

The rotating body 11 is stopped and the test weight 20 is removed. The knobs 23, 24, 25, 26 are untouched. The wheel 11 again is restored to a normal highway speed and the transducer 14 now provides a sinusoidal vibratory signal U corresponding to the inherent unbalance of the wheel 11. This signal U is delivered to the potentiometer 40 and appears at the input terminal 71 as a signal $K_1U$. This signal $K_1U$ is added to the signal appearing at the input terminal 72, namely, $K_2S\,/\phi$ and the vector sum is delivered through the output terminal 73 and the switch 51 through the contact 57 to the rheostat 44, meter amplifier 58 and meter 21. The rheostat 44 now is adjusted by turning the knob 26 until the meter 21 indicates the value of the test weight W. The rheostat 44 applies a correction factor $K_3$ to the signal from terminal 73. The signal applied to the meter 21 thus is $K_3[K_2S\,/\phi + K_1U]$ equals W.

At this point, the circuitry of FIG. 8 is fully calibrated and the operator can determine the phase relationship between the signals $K_1U$ and $[K_2S\,/\phi + K_1U]$ as well as the amplitude of the signal $K_1K_3U$. The operator now moves the switch 28 to its alternate position wherein contacts 54, 56 deliver signals to the limiters 59, 60 respectively. Also in the alternate position, the contact 54 delivers a signal to the rheostat 44.

AMPLITUDE MEASUREMENT

The signal $K_1U$ is delivered from terminal 71 through switch 50, rheostat 44, meter amplifier 58 to meter 21. In the rheostat 44, the signal $K_1U$ is adjusted by the factor $K_3$ so that the meter 21 indicates the value $K_3K_1U$. Inasmuch as the product of $K_1$ and $K_3$ is unitary, the meter 21 thus provides a direct reading of the amount of unbalance in ounces (or in whatever units of measurement were applied for the test weight 20).

PHASE ANGLE MEASUREMENT

The signal $K_1U$ is delivered from the filter 47 through switch 50 and terminal 54 to the limiter 59 and thence to the input terminal 62 of phase comparison circuit 61. The signal [$K_2S\,/\phi$ + $K_1U$] is delivered from the output terminal 73 through the switch 51 and terminal 56 to the limiter 60 and thence to the input terminal 63 of the phase comparison circuit 61.

The function of the phase comparison circuit 61 is to indicate the phase relation of two input signals applied to the terminals 62, 63.

The phase comparison circuit 61 provides a direct current output voltage which is related in magnitude to the amount of phase difference. When the phase difference is 180°, the output signal will provide a mid scale reading on the ammeter 22; at zero phase difference, the ammeter reading will be zero; as the phase difference approaches 360°, the ammeter reading approaches full scale.

Thus the angle (180° - $\theta$), see FIG. 6, is directly indicated on the ammeter 22 which may be conveniently calibrated in clock hours as shown in FIG. 2.

Because the system is adapted to left side wheels and right side wheels, it is necessary to provide a reversing switch 29 which accommodates the clockwise rotation of right side wheels and the counterclockwise rotation of left side wheels.

The operator can now apply as shown in FIG. 14 a correction weight 70 to the wheel 11 in the amount indicated by the meter 21 and at the angle (180° - $\theta$) from the reference radius 32.

VELOCITY - INDEPENDENT

Because each of the two filters 47, 48 is identical, the present unbalance determining system is relatively independent of the precise velocity at which the wheel is turning. Normally a filter will introduce a phase shift in the resulting filtered signal. However because each of the band pass filters is identical, the filter-created phase shift in the present circuitry is identical in each channel and therefore is offsetting. For this reason, the actual rotational velocity of the wheels under inspection can vary over a range of about 300 cycles per minute (5 cycles per second) without introducing any detectable change in the system precision characteristics.

CHECKING UNBALANCE CORRECTION

After the correction weight 70 has been applied to the wheel 11 (FIG. 14), the wheel may be rotated again to check the effectiveness of the correction. The adjustment knobs 23, 24, 25, 26 are untouched. The voltmeter 21 will provide a direct indication of the amount of residual unbalance in the corrected wheel. A value of less than 0.25 ounces should be considered within an acceptable tolerance.

SUMMARY

It will further be observed that the present system employs three input signals, R, U, S, and develops four internal signals, $K_1R$, $K_1U$, $K_3K_1U$ and $K_2S\,/\phi$.

During Stage One, Part One, the values are such that $K_2 = 0$; and $K_1R = 1.0$. During Stage One, Part Two, the values are such that $K_2S\,/\phi = K_1R$. During Stage Two, the values are such that $K_3[K_1U + K_2S\,/\phi] = 1.0$. Under these conditions, the value of U is $K_1K_3U$ and the value of (180° − $\theta$) is the phase angle between the two vectors $K_1U$ and $[K_1U + K_2S\,/\phi]$.

While the foregoing specification has described a method and apparatus for determining wheel unbalance wherein a synthetic electrical signal is altered in phase, it is also possible to carry out the present wheel unbalance determination by adjusting the phase of the vibratory signal.

I claim:

1. Apparatus for determining the amount and location of unbalance in a rotating wheel of a vehicle comprising:

means mechanically connected to said vehicle for generating a vibratory sinusoidal signal having an amplitude corresponding to the instantaneous vibration of the wheel;

static means, spaced apart from said vehicle, for generating a synthetic sinusoidal signal synchronous with the instantaneous rotation of said wheel;

means for rotating the said wheel in its normal mounting on the said vehicle while the vehicle is at rest;

selectively variable means for altering the phase of one of said two sinusoidal signals;

means for mixing the said vibratory signal and the said synthetic signal to produce a resultant signal;

test weight means on said wheel at a known angular relationship to an index on the said wheel;

selectively variable means for altering the amplitude of the synthetic signal, the vibratory signal and the resultant signal;

means for measuring the amplitude of the resultant signal and the vibratory signal;

means for measuring the phase relation of the vibratory signal and the resultant signal.

2. Apparatus for determining the amount and location of unbalance in a rotating wheel of a vehicle comprising:

static means, spaced apart from said vehicle, for generating a synthetic sinusoidal signal synchronous with the instantaneous relation of said wheel;

selectively variable means for altering the phase of the said synthetic signal;

means mechanically connected to said vehicle for developing a vibratory signal corresponding to the vibration of the wheel having a frequency identical to that of the wheel;

means for mixing the said vibratory signal and the said synthetic signal to produce a resultant signal;

means for rotating the said wheel in its normal mounting on the said vehicle while the vehicle is at rest;

test weight means on said wheel at a known angular relationship to an index on the said wheel;

selectively variable means for altering the amplitude of the synthetic signal, the vibratory signal and the resultant signal;

means for measuring the amplitude of the resultant signal and the vibratory signal;

means for measuring the phase relation of the vibratory signal and the resultant signal.

3. The method of determining the effective unbalance of the rotating body which comprises:

applying a test weight and an index to the rotating body along a common radius of the rotating body and causing the body to rotate at a normal operating speed;

generating a first vibratory electrical signal R having a frequency which is identical to that of the rotating body and having an amplitude which corresponds to the manifested mechanical vibration of the rotating body resulting from the influence of the applied test weight and the inherent unbalance of the rotating body;

applying the said electrical signal R to a voltmeter and adjusting the amplitude of the electrical signal R by means of a first amplitude adjustment device to produce an electrical signal $K_1(R)$ having an indicated value on the said voltmeter corresponding to the weight of the applied test weight;

developing a second sinusoidal synthetic electrical signal S having a frequency corresponding with that of the rotating body and having a known phase relationship to the index on the said rotating body;

adjusting the phase of the signal S by the angle $\phi$ and adjusting the amplitude of the signal S by the factor $K_2$ to produce a signal $K_2 S /\phi$ which, when added to the signal $K_1 R$, produces a resultant signal equal to zero;

removing the test weight from the rotating body and generating a sinusoidal vibratory electrical signal U corresponding to the inherent unbalance of the rotating body;

altering the amplitude of the signal U by the said first amplitude adjustment device to produce a signal having an amplitude $K_1 U$;

vectorially adding the signals $K_1 U$ and $K_2 S /\phi$ to produce a vectorial sum signal; altering the amplitude of the vectorial sum signal by a factor $K_3$ to produce a signal $K_3 [K_1 U + K_2 S /\phi]$ having a voltage corresponding to the weight of the initial trial weight;

altering the amplitude of the signal $K_1 U$ by the factor $K_3$ and indicating the voltage of the output signal $K_3 K_1 U$ to indicate the amount of unbalance inherently in the rotating body;

measuring the electrical phase angle between the signals $K_1 U$ and the vectorial sum of $[K_1 U + K_2 S /\phi]$ to indicate the angle ($180° - \theta$) existing between the location of unbalance of the rotating body and the index.

4. Apparatus for determining the amount and location of effective unbalance in a rotating body comprising:

first transducer means for producing a vibratory sinusoidal electrical signal having the same frequency as the said rotating body and having an amplitude corresponding to the unbalance manifestations of the rotating body;

first amplitude adjustment means connected to said first transducer;

second transducer means adapted to generate a sinusoidal synthetic reference electrical signal corresponding in frequency with the rotation of said rotating body;

phase adjustment means for altering the phase of the sinusoidal synthetic reference electrical signal and second amplitude adjustment means for altering the amplitude of the sinusoidal synthetic reference electrical signal;

mixer means having a first input terminal connected to the said first transducer means through said first amplitude adjustment means; and a second input terminal connected to the said second transducer means through the said second amplitude adjustment means and the said phase adjustment means; and having an output terminal;

third amplitude adjustment means for altering the amplitude of a sinusoidal electrical signal and having an input terminal and having an output terminal which is connected to a voltmeter;

a phase comparison circuit having two input terminals and having its output connected to a phase indicating meter;

switch means adapted to connect the circuitry whereby in a first circumstance:

the said output terminal from said mixer means is connected directly to said input terminal of said third amplitude adjustment means;

and in a second circumstance:

a. the said first input terminal is connected to the said input terminal of said third amplitude adjustment means; and b. the two input terminals of the said phase comparison circuit are connected to:

the said first input terminal and the said output terminal of said mixer means, whereby the said phase indicating meter indicates the phase angle between the signals appearing at two input terminals of the said phase comparison circuit.

* * * * *